(12) United States Patent
Derbes et al.

(10) Patent No.: US 8,840,166 B1
(45) Date of Patent: Sep. 23, 2014

(54) SLIDABLE CARGO AREA FLOOR LINER AND CARGO MANAGEMENT DEVICE

(71) Applicant: SlideLiner, L.L.C., Covington, LA (US)

(72) Inventors: David S. Derbes, Covington, LA (US); Jeffrey D. Buck, Covington, LA (US)

(73) Assignee: SlideLiner, L.L.C., Covington, LA (US)

( * ) Notice: Subject to any disclaimer, the term of this patent is extended or adjusted under 35 U.S.C. 154(b) by 0 days.

(21) Appl. No.: 13/659,394

(22) Filed: Oct. 24, 2012

Related U.S. Application Data

(60) Provisional application No. 61/570,100, filed on Dec. 13, 2011.

(51) Int. Cl.
    *B62D 33/00* (2006.01)
(52) U.S. Cl.
    USPC ............. 296/39.2; 296/39.1; 224/403
(58) Field of Classification Search
    USPC ............ 296/39.1, 39.2, 97.23; 224/281, 401, 224/402–404, 539; D12/221, 98
    See application file for complete search history.

(56) References Cited

U.S. PATENT DOCUMENTS

| | | |
|---|---|---|
| 4,023,850 A | 5/1977 | Tillery |
| 4,305,695 A | 12/1981 | Zachrich |
| 4,531,773 A | 7/1985 | Smith |
| 4,941,784 A | 7/1990 | Flament |
| 4,950,123 A | 8/1990 | Brockhaus |
| 4,979,772 A | 12/1990 | Carey et al. |
| 5,052,878 A | 10/1991 | Brockhaus |
| 5,083,830 A | 1/1992 | Mucher et al. |
| 5,110,171 A | 5/1992 | Anthony |
| 5,253,918 A | 10/1993 | Wood et al. |
| 5,269,447 A | 12/1993 | Gower et al. |
| 5,322,335 A | 6/1994 | Niemi |
| 5,421,634 A | 6/1995 | Hackett |
| 5,456,511 A | 10/1995 | Webber |
| 5,456,514 A | 10/1995 | Justice |
| 5,513,941 A | 5/1996 | Kulas et al. |
| 5,540,473 A | 7/1996 | Bills, Sr. |
| 5,562,321 A | 10/1996 | VanHoose |
| 5,584,524 A | 12/1996 | Vogel |
| 5,624,223 A | 4/1997 | Lovato |
| 5,634,408 A | 6/1997 | Jarkowski |
| 5,649,731 A | 7/1997 | Tognetti |
| 5,653,572 A | 8/1997 | Podd, Jr. et al. |

(Continued)

*Primary Examiner* — Lori Lyjak
(74) *Attorney, Agent, or Firm* — Garvey, Smith, Nehrbass & North, L.L.C.; Gregory C. Smith; Julia M. FitzPatrick

(57) ABSTRACT

A slidable cargo area floor liner and cargo management device for a vehicle, and in particular, it is a substantially flat, rectangular sheet of material which is independent of the vehicle, which slidably moves on the floor of the cargo area of the vehicle and may be completely slidably removed from the vehicle. In addition, the device also provides protection to the floor of the vehicles cargo area, organizes cargo, and secures cargo through the use of a plurality of openings and tie down points integrated into the device. In use, the liner lies flat and occupies the cargo area of a vehicle without attaching itself to the cargo area or vehicle frame. The liner is equipped with a set of handhold openings that can be gripped and pulled towards the rear opening of the vehicle to access objects which would otherwise be difficult to reach. The liner is equipped with a plurality of openings that can be used as tie down points to assist in securing cargo in the vehicles cargo area and a rear catch all that ensures cargo remains on the liner.

20 Claims, 8 Drawing Sheets

(56) References Cited

U.S. PATENT DOCUMENTS

| | | |
|---|---|---|
| 5,700,047 A | 12/1997 | Leitner et al. |
| 5,755,480 A | 5/1998 | Bryan |
| 5,816,637 A | 10/1998 | Adams et al. |
| 5,938,262 A | 8/1999 | Mills |
| D413,854 S | 9/1999 | Vitoorapakorn |
| 5,976,672 A | 11/1999 | Hodgetts |
| 5,988,723 A | 11/1999 | Adkins |
| 6,059,343 A * | 5/2000 | Emery ............... 296/39.2 |
| 6,065,792 A | 5/2000 | Sciullo et al. |
| 6,131,983 A | 10/2000 | Jackson |
| 6,302,465 B1 | 10/2001 | Faber et al. |
| 6,312,034 B1 | 11/2001 | Coleman, II et al. |
| 6,390,525 B2 | 5/2002 | Carpenter et al. |
| 6,530,730 B2 | 3/2003 | Swensen |
| 6,578,896 B1 | 6/2003 | Peterson |
| 6,648,569 B2 | 11/2003 | Douglass et al. |
| 6,860,536 B1 * | 3/2005 | Schimunek ............... 296/26.09 |
| 6,976,720 B1 | 12/2005 | Bequette |
| 7,320,572 B2 | 1/2008 | Smith |
| 7,416,234 B2 | 8/2008 | Bequette |
| 7,618,075 B2 | 11/2009 | Boddie et al. |

\* cited by examiner

SLIDABLE CARGO AREA FLOOR LINER AND CARGO MANAGEMENT DEVICE

CROSS REFERENCE TO RELATED APPLICATIONS

Priority of U.S. Provisional Patent Application Ser. No. 61/570,100 filed Dec. 13, 2011, incorporated herein by reference, is hereby claimed.

STATEMENT REGARDING FEDERALLY SPONSORED RESEARCH OR DEVELOPMENT

Not Applicable

REFERENCE TO "MICROFICHE APPENDIX"

Not Applicable

BACKGROUND OF THE INVENTION

1. Field of the Invention

The present invention relates to a slidable cargo area floor liner and a cargo management device for a vehicle, and in particular, it is a substantially flat, rectangular sheet of material which is independent of the vehicle, which slidably moves on the floor of the cargo area of the vehicle and may be completely slidably removed from the vehicle. In addition, the device also provides protection to the floor of the vehicle's cargo area, organizes cargo, and secures cargo.

2. General Background of the Invention

Prior art in the field of liners, cargo trays, and organizing devices as it relates to the cargo area of motor vehicles (i.e., pickup trucks, sport utility vehicles (SUVs), vans, crossover utility vehicles (CUVs), multi-activity vehicles (MAVs), and the like), attempts to solve seven (7) distinct issues. (1) protection of the cargo area from dents, scratches, and stains, (2) minimize difficulty in retrieving cargo from a rear cargo area, (3) extension of the cargo space to enable easier cargo loading and/or use as additional workspace, (4) provide an easily removable slidable liner that is not fastened (no screws, tracks, or rails to install) to the vehicle, (5) better organization of cargo, (6) the addition of more tie down locations to more effectively restrain cargo, (7) a liner that can fit into varying sized vehicle cargo areas.

As referenced throughout this patent application the wording "materials", "cargo" or "items" may be used interchangeably and applies to anything that can be placed in a vehicle cargo area. As referenced throughout this patent application the wording "slidable cargo area floor liner", "cargo management device" and "liner" may be used interchangeably.

It is known that providing matting or liners for vehicle cargo areas and the like tend to decrease damage to the vehicles storage area due to unwanted shifting of carried articles. Several approaches have been employed by previous inventors to protect the cargo carrying space of a vehicle. For example, U.S. Pat. No. 6,578,896 to Peterson (2003), U.S. Pat. No. 5,653,572 to Podd, Jr. et al (1997), U.S. Pat. No. 5,421,634 to Hackett (1995), U.S. Pat. No. 5,540,473 to Bills, Sr. (1996), and U.S. Pat. No. 413,854 to Vitoorapakorn (1999). Such matting or liners have various disadvantages; they may not be readily adaptable to fit in different size cargo areas, they may not effectively prevent movement of a load placed thereon, they may not include additional cargo tie down locations, and they do not allow for easy loading and unloading of the cargo area.

It is known that vehicle owners find difficulty in storing items in a cargo space without permanently staining the factory liner, upholstery, or carpet in the cargo area. The issue of protection of the upholstery, liner, or carpet in cargo holding areas of a vehicle has been addressed by a number of inventors through the development of cargo area liners of various types. Some examples of this type of invention are given in U.S. Pat. No. 4,979,772 to Carey, et al. (1990), U.S. Pat. No. 5,110,171 to Anthony (1992), and U.S. Pat. No. 5,322,335 to Niemi (1994). These inventions serve well for protection of the interior of the cargo area but do not address the other previously identified issues.

It is known that vehicle owners find difficulty in adding and removing cargo to and from the cargo storage area of a vehicle. Additionally, designers of some vehicles choose lining materials for the floor and walls of these compartments which have high coefficients of friction so that contents tend to remain stationary by reason of their "adhesion" to the surface. Added to the awkward access to such compartments, the difficulty in sliding something over this high friction surface dramatically decreases the utility of the vehicle storage area. For example, simple activities such as storing groceries in the cargo area of the vehicle are made difficult if not impossible by a person of small stature. Even larger, stronger users, often have trouble reaching and moving items to and from the cargo area. Users are often forced to climb into the back of the vehicle or awkwardly lean over and or into the rear cargo area which can cause physical injuries to the users back. The problem is further compounded in pick-up trucks with a covered cargo area (i.e. Tonneau covers and truckcaps and the like).

Several approaches have been employed by previous inventors to expand the cargo carrying capacity of pickup truck beds in the form of tailgate or truck bed extenders. For example, U.S. Pat. No. 4,023,850 to Tillery (1977), U.S. Pat. No. 4,531,773 to Smith (1985), U.S. Pat. No. 4,531,773 to Smith (1985), U.S. Pat. No. 5,700,047 to Leitner and U.S. Pat. No. 5,755,480 to Bryan (1998) disclose tailgate extension devices to provide for a longer bed floor area. While these inventions do provide for an expanded cargo floor area, steps necessary for their assembly and regular use are relatively complex. When not in use as a bed extension the devices serve no alternative beneficial purpose.

Another approach, with observed examples focusing on increased ease of access to stored cargo items, involves the development of plates that slidably engage the floor of the cargo area via roller means. Several examples of this approach are presented in the following U.S. Pat. No. 5,456,511 to Webber (1995), U.S. Pat. No. 5,513,941 to Kulas et al. (1996), U.S. Pat. No. 5,634,408 to Jarkowski (1997), U.S. Pat. No. 5,649,731 to Tognetti (1997), and U.S. Pat. No. 5,938,262 to Mills (1999). While these inventions provide ease of access to loaded cargo items and potentially an expanded cargo area, their construction is complex and incorporates invasive mounting mechanisms, which in most if not all cases require drilling holes into the floor or walls of the vehicle cargo area. Examples of such inventions currently available from aftermarket manufactures are relatively expensive (ranging from approximately $700 to $2,000 US Dollars) due in part to their complexity and manufacturing costs.

It is known that vehicle owners find difficulty in restraining and/or separating loaded cargo during travel. Prior art that addresses this difficulty are disclosed in U.S. Pat. No. 4,941,784 to Flament (1990), U.S. Pat. No. 5,253,918 to Wodd et al (1993), U.S. Pat. No. 5,269,447 to Gower, et al. (1993), U.S. Pat. No. 5,456,514 to Justice (1995), U.S. Pat. No. 5,562,321 to VanHoose (1996), U.S. Pat. No. 5,976,672 to Hodgetts (1999), and U.S. Pat. No. 6,530,730 by Swenson (2003). While these inventions address the need for both interior protection and cargo retention, they do not offer a solution to the problem of potential injury from a person leaning into the cargo area for loading/unloading cargo. In addition, these solutions require modifications to the vehicles frame or body.

An approach to addressing the previously stated issues (cargo area protection, cargo access, cargo restraints) can be seen in U.S. Pat. No. 5,634,408 to Jarkowski (1997) in which an invention is disclosed involving a vehicle cargo tray which lines the floor of the cargo area and can extend outward via roller means so as to slide beyond the open cargo area for loading. Interior protection and cargo retention devices are also included in this invention. However, the irregular form of this invention and depth of its embodiment are obtrusive to the cargo area of the vehicle so much so that the cargo area loses some of its functionality when the device is in position. This limits the capacity and usability of the vehicle's cargo area when the device is placed within the cargo area. In addition, this approach uses a front lip on the liner. This feature restricts the movement of cargo in and out of the cargo area and would require a user to lift items above the front lip in order to remove them from the cargo area.

Yet other approaches that addresses the previously mentioned problems are U.S. Pat. No. 6,312,034 to Coleman, II et al (2001) and U.S. Pat. No. 7,416,234 to Bequette (2008). Although this art provides bed extension, bed sliding, and cargo organization, it requires a rigid attachment of the device to the vehicle body or vehicle frame.

Yet another approach that addresses all of the problems is U.S. Pat. No. 6,648,569 to Douglass (2003). Although this prior art does not require any rigid attachments to the vehicle, it is made up of multiple, separate platforms that utilize the wheel wells to anchor itself and interlock with the main platform. The interlocking design that enables the sliding is prone to receiving debris and dirt that will restrict its movement. In addition, this approach complicates the removal of the device from the bed of the vehicle due to additional pieces that restrict the user from removing the device in a single action.

Yet another approach that addresses some of the issues is U.S. Pat. No. 5,584,524 to Vogel (1996). In this approach a liner that occupies a substantial portion of the surface area of the cargo area has grips allowing the user to pull the liner to the rear of the vehicle in order to access objects that would normally be difficult to reach. Although, this approach addresses the problem of accessing objects in the cargo area of a vehicle it fails to address any of the other issues.

Yet another approach that addresses some of the problems is U.S. Pat. No. 5,624,223 to Lovato (1997). Although this approach addresses the loading and unloading of cargo from the cargo space of a vehicle it fails to provide a solution for the restraint and storage of the cargo. In addition, the tether system presented in this solution adds additional complexity and rigid attachments to vehicle.

It can therefore be seen that problems and deficiencies still exist in the art. There is a real need for an improved way to assist in loading and unloading cargo (ease of access, provides added protection, and enables cargo restraint in such a way that does not require a rigid connection to the vehicle. The preferred embodiment of the present invention addresses these previously mentioned issues; (1) protection of the cargo area from dents, scratches, and stains, (2) minimize difficulty in retrieving cargo from a rear cargo area, (3) extension of the cargo space to enable easier cargo loading and/or use as additional workspace, (4) provide an easily removable slidable liner that is not fastened (no screws, tracks, or rails to install) to the vehicle, (5) better organization of cargo, (6) the addition of more tie down locations to more effectively restrain cargo, (7) a liner that can fit into varying sized vehicle bed cargo areas.

The following U.S. patents are incorporated herein by reference:

| U.S. Pat. No. | Title | Issue Date |
| --- | --- | --- |
| 4,305,695 | Rollout Tray for Panel Truck Bed | Dec. 15, 1981 |
| 4,941,784 | Device for Stabilizing Objects within the Trunk of a Vehicle | Jul. 17, 1990 |
| 4,950,123 | Retractable Bed for Truck | Aug. 21, 1990 |
| 4,979,772 | Apparatus for Protecting Interior Floor Covering of a Vehicle | Dec. 25, 1990 |
| 5,052,878 | Retractable Bed for Truck | Oct. 1, 1991 |
| 5,083,830 | Truck Bed Insert | Jan. 28, 1992 |
| 5,110,171 | Protective Liner for Cargo Area of Vehicle | May 5,1992 |
| 5,253,918 | Truck Bed Liner with Integral Rail and Tie-down Fasteners | Nov. 19, 1993 |
| 5,269,447 | Vehicular Cargo Tray Having Movable Dividers | Dec. 14, 1993 |
| 5,322,335 | Automotive Floor Liner | Jun. 21, 1994 |
| 5,456,514 | Truck Bed Load Organizer Apparatus | Oct. 10, 1995 |
| 5,513,941 | Rolling Cargo Apparatus | May 7, 1996 |
| 5,584,524 | Liner for Truck Bed | Dec. 17, 1996 |
| 5,624,223 | Truck Bed Unloading Apparatus | Apr. 29, 1997 |
| 5,634,408 | Vehicle Cargo Tray | Jun. 3, 1997 |
| 5,653,572 | Conveyor Sheet Cargo Container and Method | Aug. 5, 1997 |
| 5,816,637 | Truck Cargo Space Extension Bed | Nov. 6, 1998 |
| 5,938,262 | Slidable Truck Bed Extension | Aug. 17, 1999 |
| 5,976,672 | Cargo Liner and Cargo Holder System | Nov. 2, 1999 |
| 5,988,723 | Truck Bed Liner and Mat Assembly | Nov. 23, 1999 |
| 6,065,792 | Slide-A-Bed System for a Truck | May 23, 2000 |
| 6,131,983 | Truck and Bed Utility Tarpaulin | Oct. 17, 2000 |
| 6,302,465 | Cargo Restraining Gate Assembly and Method | Oct. 16, 2001 |
| 6,312,034 | Vehicle Bed and Cargo Area Liner with Integrated Sliding Floor Extension | Nov. 6, 2001 |
| 6,390,525 | Vehicle Extension Slide | May 21, 2002 |
| 6,530,730 | Article Anchoring Device for Vehicle and Method of Producing | Mar. 11, 2003 |
| 6,578,896 | Mat for a Motor Vehicle Compartment | Jun. 17, 2003 |
| 6,648,569 | Vehicle Cargo Bed with Movable Platform | Nov. 18, 2003 |
| 6,976,720 | Vehicle Sliding Floor Extension | Dec. 20, 2005 |
| 7,320,572 | Cargo Unloading Apparatus and Method | Jan. 22, 2008 |
| 7,416,234 | Vehicle Sliding Floor Extension | Aug. 26, 2008 |
| 7,618,075 | Hybrid Truck Bed Liner | Nov. 17, 2009 |

BRIEF SUMMARY OF THE INVENTION

The preferred embodiment of the present invention solves the problems confronted in the art in a simple and straightforward manner. Therefore, what is provided is a substantially flat and ridged sheet of material having substantially rectangular dimensions so that the width of the device allows it to slide in and out of the vehicle cargo area between the wheel wells of the vehicle. The underside would have a substantially smooth surface which would make contact with the surface of the vehicle cargo area floor upon which it was placed. The smooth surface of the underside would facilitate the ease of sliding the device into and out of the vehicle.

The device would be equipped with a smooth upper surface which would facilitate the sliding in of cargo or materials over the surface of the device and the removal of the cargo or materials in a similar manner. There could be further provided a raised section near the rear and side of the liner, a catch-all, which would hold materials/cargo onto the device while being pulled from the vehicle cargo area. It is contemplated that the catch-all would have a series of openings and/or tie downs attached to be used as additional tie down points for securing cargo The sliding liner device, in its simplest form, is a single sheet of a rigid material such as a High Density Polyethylene sheet formulated to meet specific outdoor requirements such as weather and UV resistance. In addition, special post-production treatment enhances the sheets ability to withstand the effects of moisture, direct sunlight, chemicals and petro chemical products. The material is smooth to lightly textured on both the lower (underside) and upper surface. The flat smooth lower surface provides a low friction surface which easily slides in and out of the vehicle cargo area. The relatively large surface area distributes the weight of the cargo loads placed thereon and therefore reduces friction between the lower surface of the device and the upper surface of the existing vehicle cargo area. The sheet, in and of itself, is not fastened to the vehicle cargo area or frame. It is simply placed on the surface of the vehicle cargo area floor and is slidably engaged onto the bed between the wheel wells of the vehicle and has sufficient weight so that the liner does not become airborne when the vehicle is moving at high speeds, having no items placed thereupon. The present invention provides a liner that is substantially firm so as to support heavy objects and which has a flat undersurface which engages the surface of the vehicle cargo area so that when heavy items are placed thereupon, there is little or no bending or bowing of the liner which would occur if the liner had raised feet or wheels as is in the prior art. However, one of the unique characteristics of the HDPE sheeting contemplated for the construction of the device is that the material is somewhat flexible. This flexible characteristic separates the device from other rigid boards or trays discussed in the prior. In addition, the flexibility enables the user to lift and manipulate the device off of the surface of the bed floor while cargo is placed thereupon. This allows the board to be lifted, partially, without lifting the weight of the cargo placed thereupon.

The smooth upper surface allows cargo to be pushed over the smooth surface from the rear or tail gate section of the vehicle forward, toward the cab of the vehicle in the loading process. Unloading is accomplished by opening the tail gate, accessing the items which are easily reached from the rear of the vehicle, removing those items and then grasping the handle openings provided on the sliding liner and physically pulling the sliding liner in a rear direction thereby providing easy access to the materials stored mid-section and then further sliding the liner out providing easy access to the materials stored or situated forward or toward the cab section of the vehicle. In addition, utilizing the devices' handle openings, the liner can be hung, attached, leaned, or the like from the ceiling or against the wall when it is not needed in the vehicle.

In yet another alternate embodiment, it is contemplated that an end portion or multiple portions of the liner would be hinged along a score line so that when the tailgate of the vehicle is closed, the end portion would hinge upwardly against the tailgate, and when the tailgate was lowered, the hinged portion would fall onto the tailgate which would allow a user to pull the device from the vehicle with more ease.

As the device is pulled out, the hinged sections will fall toward the ground allowing closer access to other cargo placed on the sliding, loading and unloading device.

In yet another alternate embodiment, it is contemplated that the device would be hinged along a scoreline along its longest dimension in order to allow the device to fold up and thus is easier to store.

The preferred embodiment of the present invention would have a plurality of eyelets and/or tie down positions which would be distributed across the liner so that the eyelets and tie downs could be threadably engaged therein so as to allow bungee cords, fasteners, or the lot to be engaged into the eyelets/tie downs for holding materials positioned onto the device in place, restricting movement while the vehicle is in motion. Elongated handle holes or slots could be installed therein where the eyelets could be moved forward or rearward as needed depending on the positioning of the cargo to be secured.

In yet another alternate embodiment, it is contemplated that a second set of handles may be built into the sides of the slidable liner for the purpose of holding additional cargo straps carrying the device once removed from the vehicle, and/or the storage of the device when not in use (i.e. on a wall, ceiling, etc.).

In yet another alternate embodiment, it is contemplated that cargo crates that interlock into each other could be placed on top of the liner and assist in cargo area organization and access to cargo.

In yet another alternate embodiment, it is contemplated that the upper surface has mounting points for aftermarket cargo management devices such as bike racks, ski racks, snowboard racks, canoe racks, fishing pole holders, air tank holders, and the like. These mounting points would be customizable to each user's needs and preferences and allow flexibility in the devices day to day employment. In addition, these devices can be integrated into the liner without having to modify the bed, cargo area, or frame of the vehicle.

It will be appreciated by those skilled in the art that the above described embodiments are illustrative of just a few of the numerous variations of arrangements of the disclosed elements used to carry out the disclosed invention. While the invention has been particularly shown, described, and illustrated in detail with reference to preferred embodiments and modifications thereof, it should be understood by that the foregoing and other modifications are exemplary only, and that equivalent changes in form and detail may be made without departing from the true spirit and scope of the invention as claimed, except as precluded by the prior art.

It should also be understood that while the above and other advantages and results of the present invention will become apparent to those skilled in the art, the following detailed, description and accompanying drawings, showing the contemplated novel construction, combinations, and elements as herein described, and more particularly defined by the appended claims, it is understood that changes in the precise embodiments of the herein disclosed invention are meant to be included within the scope of the claims, except insofar as they may be precluded by the prior art.

DESCRIPTION OF THE DRAWINGS

For a further understanding of the nature, objects, and advantages of the present invention, reference should be made to the following detailed description, read in conjunction with the following drawings, wherein like reference numerals denote like elements and wherein.

DETAILED DESCRIPTION OF PREFERRED EMBODIMENTS

Figure 1:
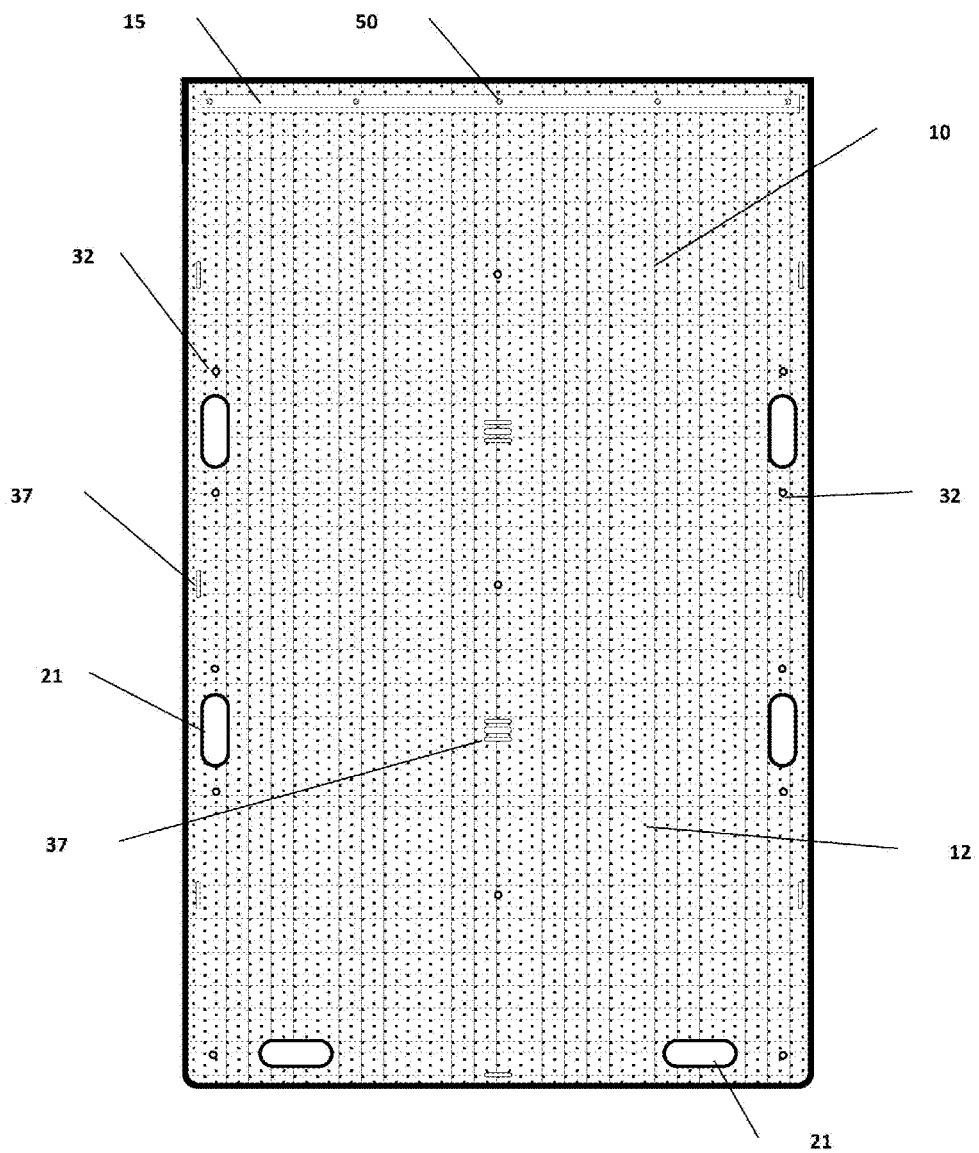
FIG. 1 illustrates a top view of the liner of the present invention.
Figure 2:
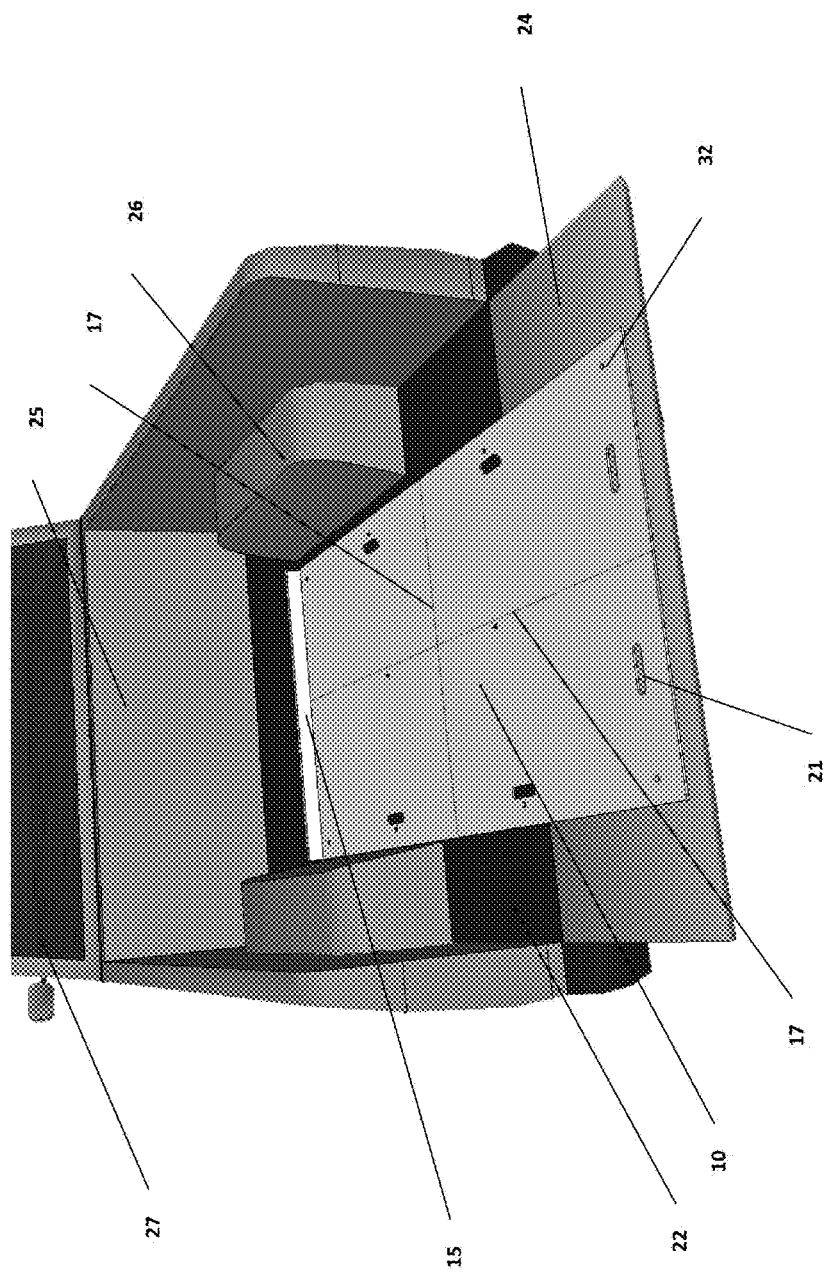
FIG. 2 illustrates an isometric view of the present invention positioned onto a vehicle cargo area.
Figure 5:
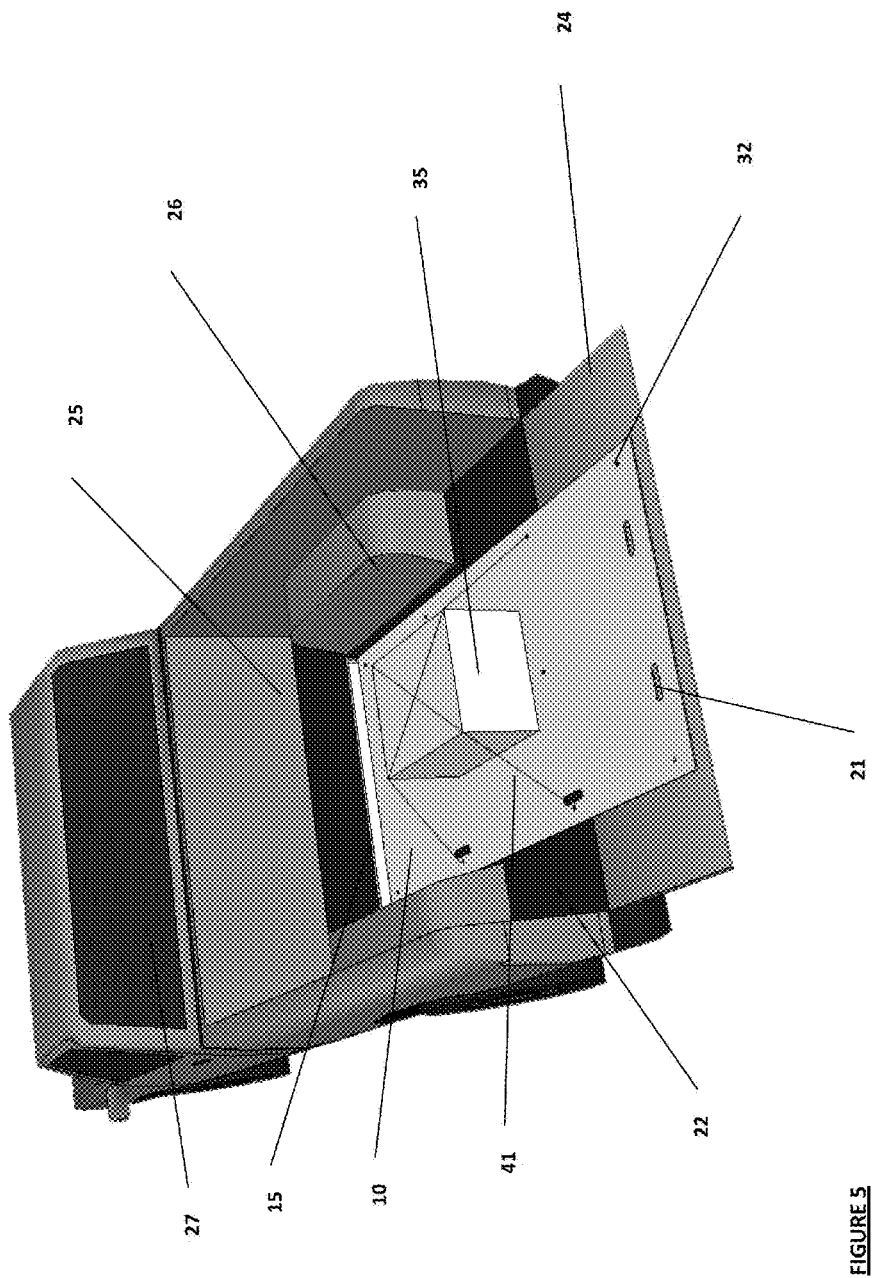
FIG. 5 illustrates a perspective of the present invention securing cargo.
Figure 6:
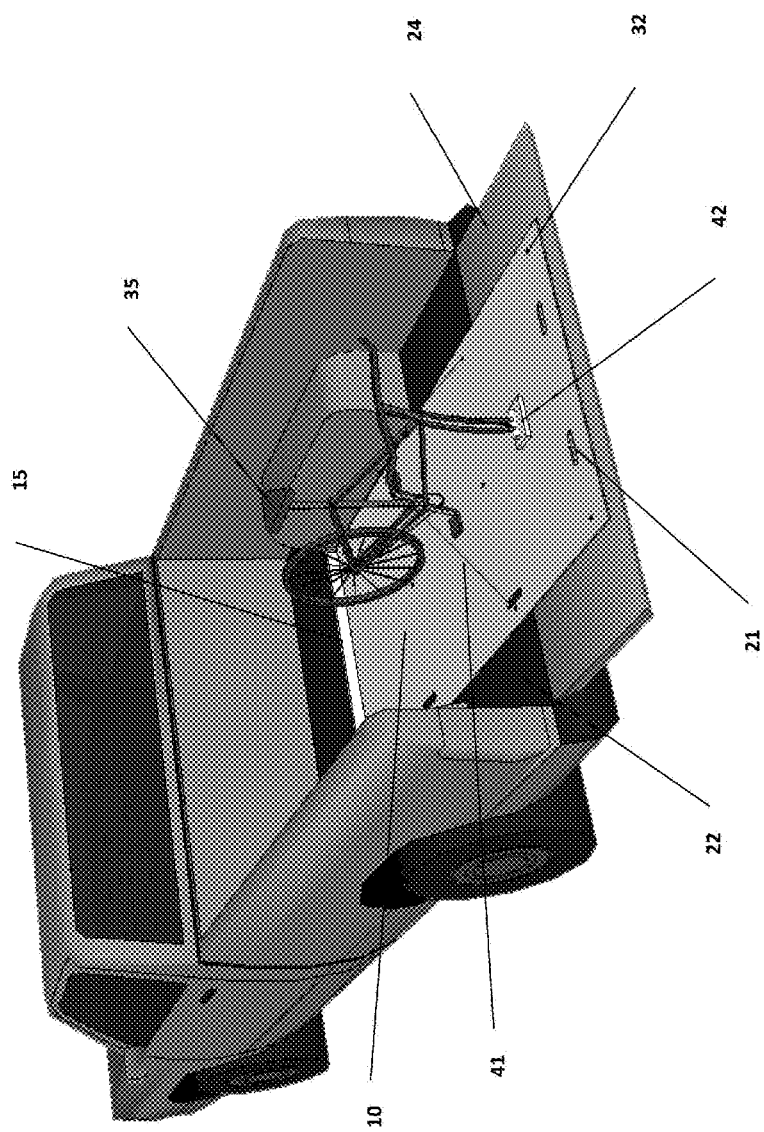
FIG. 6 illustrates a perspective of the present invention with an aftermarket cargo management device mounted.
Figure 7:
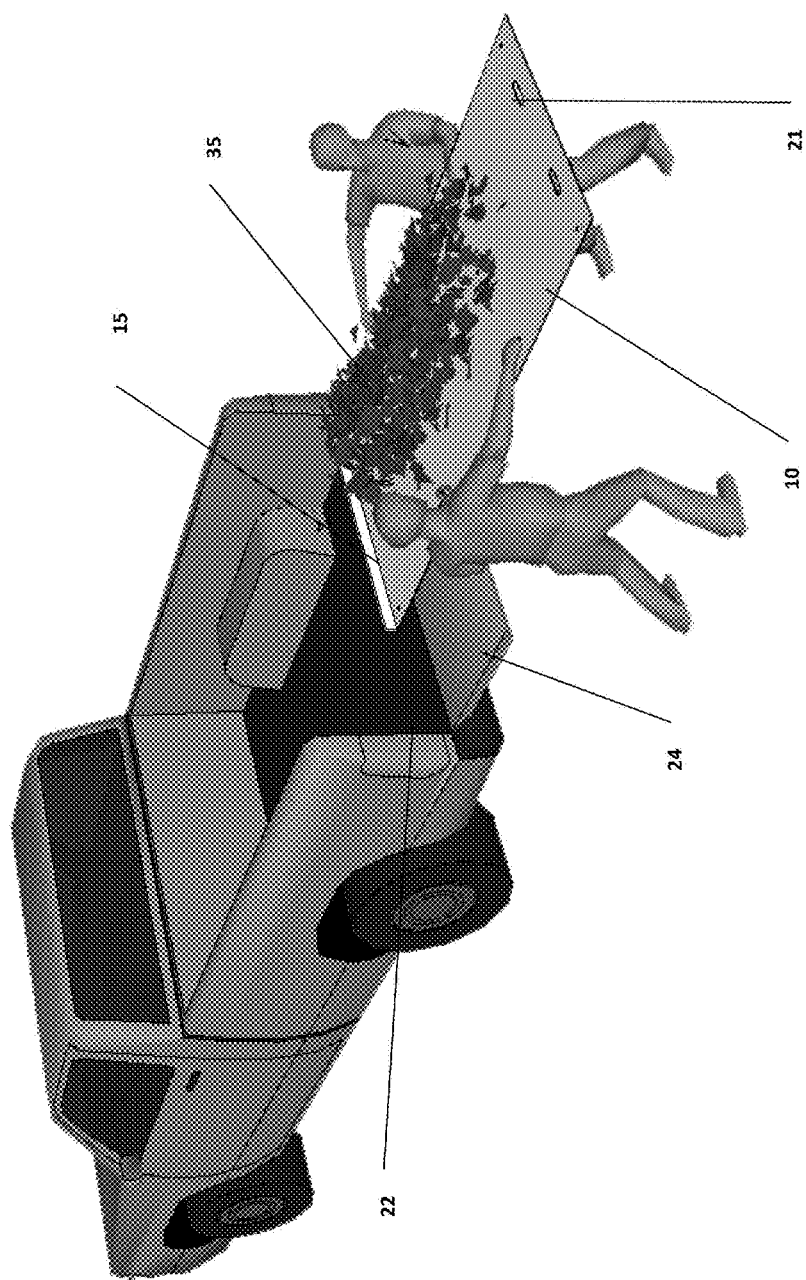
FIG. 7 illustrates a perspective of the present invention with cargo loaded.

FIGS. 1-7 illustrate the preferred embodiment of the apparatus of the present invention, 10. As illustrated in FIG. 1, cargo area floor liner 10, comprises a substantially rectangular plastic polymer sheet having an upper surface 12 with a plurality of eyelets 32 and slots through liner for tie down straps 37. Cargo area floor liner 10 has catch-all 15 attached with screw, bolt, or rivet 50 to the rear of the device. As illustrated in FIG. 2, the liner 10 has been lowered into a truck bed 22 where the tailgate 24 is set down, with the rear end of liner 10 set against the back wall 25 of the cab 27 of the truck. In the embodiment illustrated in FIGS. 1 and 2, the liner 10 resting on the truck bed 22. The liner 10 fitting between the interior of the wheel wells 26 of the truck bed 22. It is in this position that the liner 10 is in position for receiving materials onto the upper surface 12 of liner 10. Further, as illustrated in FIGS. 1 and 2, is a plurality of tie down assemblies 32 positioned across the liner 10, although more or less could be utilized. In the preferred embodiment, the tie down assemblies 32 would be threadably engaged into the liner 10, or they could extend through the entire liner and thread into a nut on the under surface on the liner. FIG. 7 illustrates in detail the manner in which tie down assemblies 32 are secured to liner 10. The tie down assemblies 32 would have the ability to be used with bungee cords, netting, or the like to hold certain objects in place which may become airborne when they are not held in place by a bungee cord, netting or the like. If the tie down assemblies 32 are not needed for a particular transport task, they could be disengaged and removed from the liner 10.

Figure 3A:
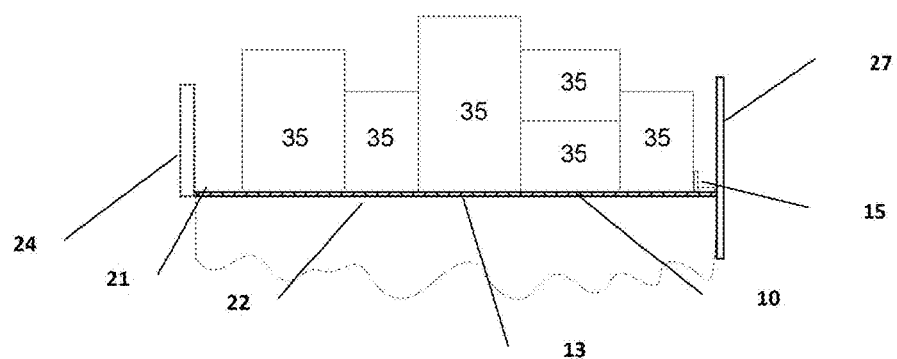
FIGS. 3A-3E illustrate side views of a vehicle cargo area and liner of the present invention with materials loaded on it.

FIG. 3A illustrates the liner 10 placed on the truck bed 22 where there are positioned a plurality of containers 35 of various size and shapes which would be placed onto the truck bed 22, and the tailgate 24 is in the closed position (Arrows 29).

Figure 3B:
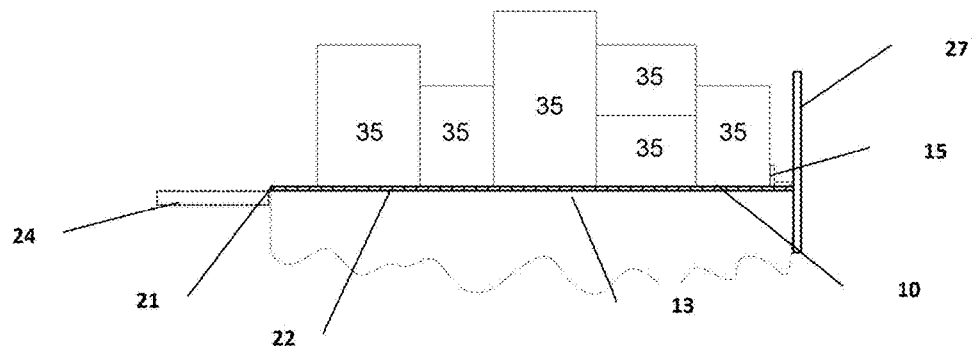

As seen in FIG. 3B, when the truck has arrived to its destination, the tailgate 24 has been lowered into the flat open position.

Figure 3C:
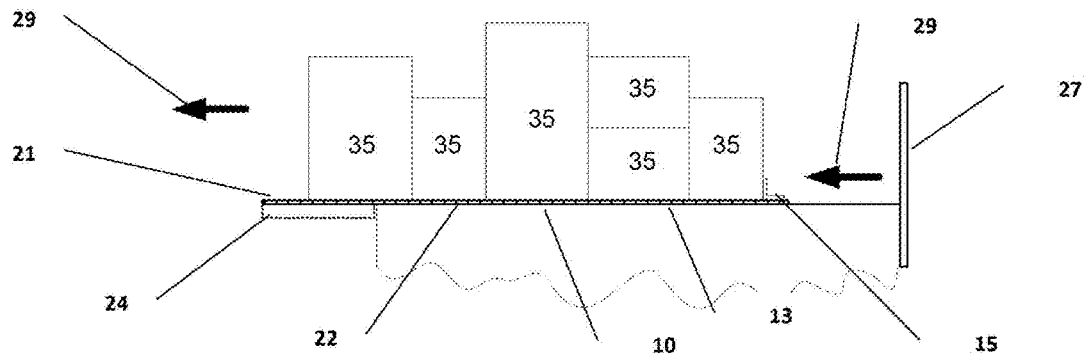

As seen in FIG. 3C, to move the cargo (containers 35) from the truck (Arrows 29) the liner 10 is simply pulled from the truck bed 22 utilizing handheld openings 21 on front of liner 10. sliding liner 10 outward along its under surface 13, with the various containers 35 moving to the rear of the truck over the tailgate 24 so that the cargo 35 closest to the rear of the truck's tailgate 24 can be easily unloaded. Note that the rear catch-all 15 prevents the containers 35 from sliding off of rear of the liner 10.

Figure 3D:
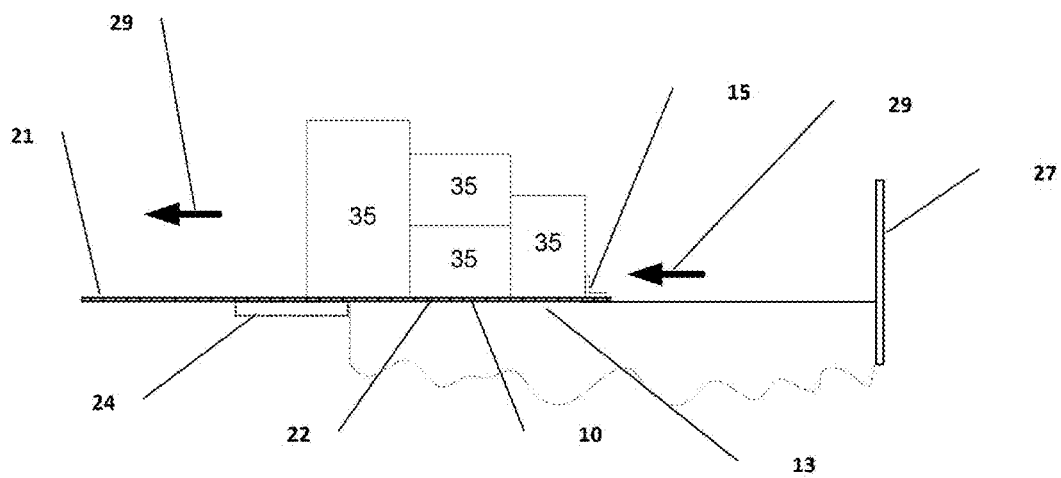

As seen in FIG. 3D, the liner 10 has been pulled out further beyond tailgate 24 using hand hold openings 21 which allow easy access to those items stowed further to the rear of liner 10. Once all materials 35 have been unloaded, the liner 10 may be slid back onto the truck bed 22 for further use. It should be noted that although not illustrated, when the liner 10 is being unloaded, it would be pulled from the truck as seen in FIGS. 3C and 3D. The containers 35 would be placed thereupon, and as the containers are placed upon the liner 10, the liner 10 would be gradually slid further onto the truck bed 22 until all the materials are in place and the tailgate 24 would be closed as seen in FIG. 3A.

Figure 3E:
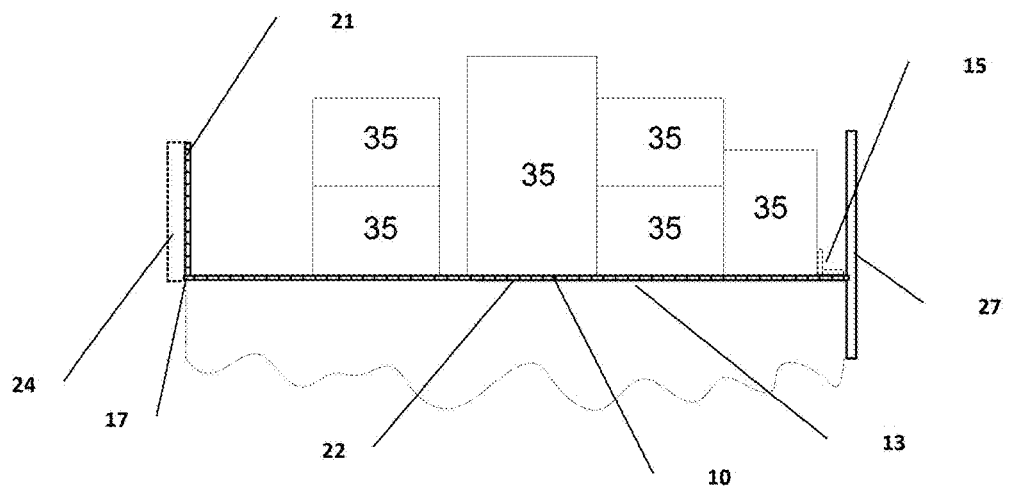

FIG. 3E depicts an alternate embodiment in which liner 10 has one or more score lines 17 into the material that allows for liner 10 to fold or hinge along the score lines 17. As seen in FIG. 3E, liner 10 has a score line 17 that allows a portion of the liner 10 to be folded up and against the truck gate 24 when closed.

Figure 4:
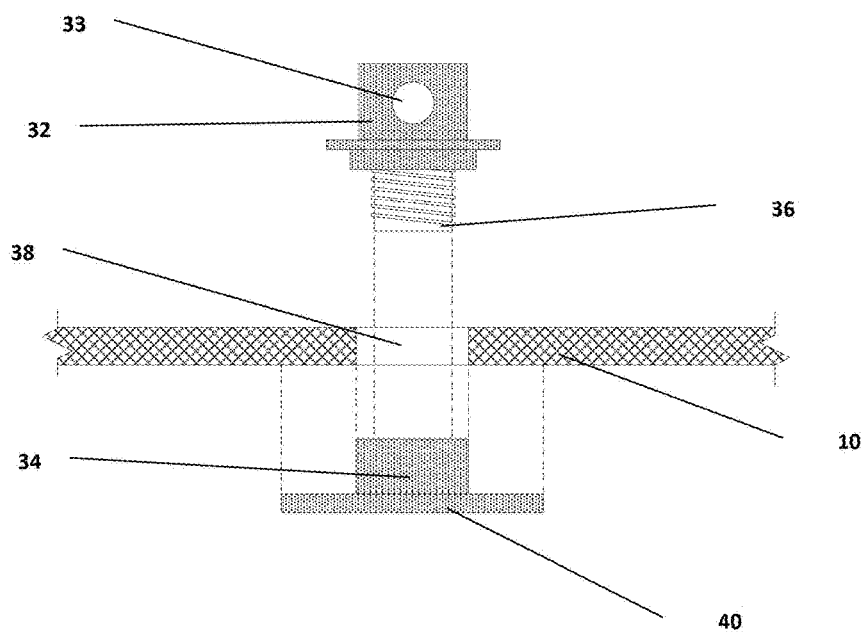
FIG. 4 illustrates an exploded view of the tie down assembly.

FIG. 4 illustrates an exploded view of the tie down assembly 32 with eyelet opening 33 and base 34. The base 34 with skid 40 would be pushed through liner 10 through hole 38. The tie down assembly would be threadably engaged using threads 36 into base 34.

FIG. 5 depicts liner 10 placed on the truck bed 22 with cargo 35 placed thereupon and secured with straps/bungee cords 41 to the plurality of tie down assemblies 32;

FIG. 6 depicts the liner 10 with aftermarket cargo management device 42 attached to liner 10 and used to hold cargo 35. Cargo straps/bungee cords 41 help to restrain the cargo; and FIG. 7 depicts liner 10 being unloaded from truck bed 22 with cargo 35 thereupon.

The following is a list of parts and materials suitable for use in the present invention:

| PARTS LIST: | |
|---|---|
| PART NUMBER | DESCRIPTION |
| 10 | slidable cargo area floor liner |
| 12 | upper surface |
| 13 | underside |
| 15 | rear catch all |
| 17 | score line |
| 21 | hand hold openings |
| 22 | truck bed |
| 24 | vehicle tailgate |
| 25 | vehicle back wall |
| 26 | vehicle wheel wells |
| 27 | vehicle cab |
| 29 | arrows |
| 32 | tie down assembly |
| 33 | eyelet portion |
| 34 | base of tie down assembly |
| 35 | cargo |
| 36 | threaded element |
| 37 | slots through liner for tie down straps |
| 38 | hole through liner |
| 40 | skid |
| 41 | strap/bungee cord |
| 42 | aftermarket cargo management device |
| 50 | bolt/screw/rivet |

The foregoing embodiments are presented by way of example only; the scope of the present invention is to be limited only by the following claims.

The invention claimed is:

1. A cargo area floor liner and a cargo management apparatus for use with a vehicle having a cargo space, comprising:
   a) a substantially rectangular body portion comprised of a strong material having a very low coefficient of friction for sliding along and resting on the vehicle cargo space;
   b) a wall portion detachably secured to and extending upward from an edge of the liner adjacent to the cab of the vehicle for maintaining items resting on the liner to remain on the liner when the liner is slidably removed from the cargo space;
   c) a plurality of spaced apart openings formed in the body of the liner, each opening defining an attachment point between the liner and cargo resting on the liner for securing the cargo in place;
   d) handle openings formed in the body of the liner for moving the liner into and off of the cargo space; and e) a lower surface of the liner resting on the cargo space further comprising a plastic polymer material, defining the low coefficient of friction for sliding along the cargo space.

2. The apparatus in claim 1, wherein an upper side of the liner comprises a plastic polymer material, or some other suitable material, having a smooth outer surface that enables the ease of movement of cargo over the upper surface.

3. The apparatus in claim 1, further comprising a plastic polymer material which is manufactured through a process selected from a group which comprises extrusion, rotational molding, blow molding, injection molding, or compression molding.

4. The apparatus in claim 1, wherein the apparatus is manufactured of a plastic polymer material having the capabilities of UV resistance, chemical resistance, stain resistance and impact resistance.

5. The apparatus in claim 1, where the upper side of the liner is smooth to slightly textured to facilitate the movement of cargo over the upper surface of the apparatus.

6. The apparatus in claim 1, where the lower side may be smooth to slightly textured to facilitate the movement of the apparatus over the surface of the cargo area.

7. The apparatus in claim 1, further comprising a characteristic of flexibility which allows the apparatus to be lifted without lifting the full weight of the cargo placed thereon, when the cargo is placed a reasonable distance away from the lifting points or handles.

8. The apparatus in claim 1, wherein the upper side has attachment points for aftermarket cargo management devices such as ski racks, bike racks, and fishing rod holders.

9. The apparatus in claim 1, wherein the body is scored along a width of the body in one or more locations to allow the body to be hingedly folded up, allowing for easier access to cargo on the device, ease of movement, and ease of storage.

10. The apparatus in claim 1, where in the body is scored along a length of the body in one or more locations to allow the body to be folded up, enabling ease of movement and storage.

11. The apparatus in claim 1, wherein the device would be constructed of material sufficiently light to be easily removable from the vehicle cargo area, yet have sufficient weight to prevent the liner from becoming airborne when the vehicle is traveling and there are no contents resting on the liner.

12. The apparatus in claim 1, wherein the liner would be constructed of material sufficiently light and have openings positioned around the body margins to allow the device to be easily hung on a wall for storage.

13. The apparatus in claim 1, further comprising a score line to hinge a portion of the liner to the rectangular body portion which would rest on the tail gate of the vehicle when the tail gate is lowered for loading or unloading contents in the bed of the vehicle.

14. A floor liner apparatus positionable on a flat storage space of a vehicle, comprising:
   a) a substantially rectangular body portion of plastic polymer material having the capabilities of UV resistance, chemical resistance, stain resistance and impact resistance;
   b) a lower surface of the rectangular body portion for resting on the vehicle storage space, and comprising a plastic polymer material having a low coefficient of friction for sliding along the cargo space;
   c) an upper surface for supporting cargo on the rectangular body portion, and further comprising attachment points for aftermarket cargo management devices such as ski racks, bike racks, and fishing rod holders to be attached thereto;
   d) a wall portion detachably secured to and extending upward from an edge of the liner adjacent a cab of the vehicle for maintaining items resting on the liner to remain on the liner when the liner is removed from the cargo space;
   e) handle openings formed in the body of the liner for moving the liner into and off of the cargo space; and
   f) the body portion scored along a length of the body in one or more locations to allow the rectangular body portion to be folded up for ease of movement, placement onto the cargo space, and storage.

15. The apparatus in claim 14, further comprising a score line to hinge a portion of the liner to the rectangular body portion which would rest on the tail gate of the vehicle when the tail gate is lowered for loading or unloading contents in the bed of the vehicle.

16. The apparatus in claim 14, further comprising a characteristic of flexibility which allows the apparatus to be lifted without lifting the full weight of the cargo placed thereon, when the cargo is placed a reasonable distance away from the lifting points or handles.

17. A floor liner apparatus positionable a flat storage space between the wheel wells of a pick up truck, comprising:
   a) a substantially rectangular body portion of plastic polymer material having the capabilities of UV resistance, chemical resistance, stain resistance and impact resistance;
   b) a lower surface of the rectangular body portion resting on the flat storage space, and comprising a plastic polymer material having a low coefficient of friction for easily sliding the liner along the cargo space;
   c) an upper surface of the rectangular body portion for supporting cargo thereon;
   d) attachment points on the body portion for attaching aftermarket cargo management devices such as ski racks, bike racks, and fishing rod holders to the rectangular body portion;
   e) a second portion of the liner secured on the tail gate of the truck and hinged along a score line to the rectangular body portion, so that the second portion would rest on the tail gate of the truck at all times when the tail gate is moved between open and closed positions; and
   f) the body portion hinged along a score line along a length of the body in one or more locations to allow the rectangular body portion to be folded up for ease of movement, placement onto the cargo space, and storage.

18. The apparatus in claim 17, further comprising a wall portion detachably secured to and extending upward from an edge of the liner adjacent a cab of the vehicle for maintaining items resting on the liner to remain on the liner when the liner is pulled from the cargo space.

19. The apparatus in claim 17, wherein the liner would be constructed of material sufficiently light and have openings positioned around the body margins to allow the device to be easily hung on a wall for storage.

20. The apparatus in claim 17, wherein the body is scored along the width in one or more locations to allow the body to be folded up, allowing for easier access to cargo on the device, ease of movement, and ease of storage.

* * * * *